(12) United States Patent
Sosnovik et al.

(10) Patent No.: US 12,125,228 B2
(45) Date of Patent: Oct. 22, 2024

(54) TRAINING A MACHINE LEARNABLE MODEL TO ESTIMATE RELATIVE OBJECT SCALE

(71) Applicant: Robert Bosch GmbH, Stuttgart (DE)

(72) Inventors: Ivan Sosnovik, Amsterdam (NL); Arnold Smeulders, Amsterdam (NL); Konrad Groh, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 370 days.

(21) Appl. No.: 17/662,013

(22) Filed: May 4, 2022

(65) Prior Publication Data

US 2022/0375113 A1    Nov. 24, 2022

(30) Foreign Application Priority Data

May 18, 2021   (DE) ...................... 10 2021 205 034.4

(51) Int. Cl.
| | |
|---|---|
| *G06K 9/00* | (2022.01) |
| *G06T 3/40* | (2006.01) |
| *G06T 7/60* | (2017.01) |
| *B25J 9/16* | (2006.01) |
| *G05D 1/00* | (2006.01) |

(52) U.S. Cl.
CPC ................. *G06T 7/60* (2013.01); *G06T 3/40* (2013.01); *B25J 9/1697* (2013.01); *G05D 1/0088* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2012/0027290 A1    2/2012   Baheti et al.

FOREIGN PATENT DOCUMENTS

EP          3965009 A1       3/2022

OTHER PUBLICATIONS

Marcos et al., "Scale equivariance in CNNs with vector fields" (Year: 2018).*

(Continued)

*Primary Examiner* — S J Park
(74) *Attorney, Agent, or Firm* — NORTON ROSE FULBRIGHT US LLP; Gerard A. Messina (57) ABSTRACT

A system and computer-implemented method for training a machine learnable model to estimate a relative scale of objects in an image. A feature extractor and a scale estimator comprising a machine learnable model part are provided. The feature extractor may be pretrained, while the scale estimator may be trained by the system and method to transform feature maps generated by the feature extractor into relative scale estimates of objects. For that purpose, the scale estimator may be trained on training data in a specific yet non-supervised manner which may not require scale labels. During inference, the scale estimator may be applied to several image patches of an image. The resulting patch-level scale estimates may be combined into a scene geometry map which may be indicative of a geometry of a scene depicted in the image.

17 Claims, 7 Drawing Sheets

(56) References Cited

OTHER PUBLICATIONS

Sosnovik et al., "Scale-Equivariant Steerable Networks," Cornell University, 2020, pp. 1-14. <https://arxiv.org/pdf/1910.11093.pdf> Downloaded May 3, 2022.

Vadamala and Aklak: "Adaptive patch feature matching and scale estimation for visual object tracking," Journal of Electronic Imaging, 28(3), (2019), pp. 033037-1 through 033037-11.

Xu, et al.: "Patch-based Scale Calculation for Real-time Visual Tracking," IEEE Signal Processing Letters, 23(1), (2016), pp. 40-44.

* cited by examiner

TRAINING A MACHINE LEARNABLE MODEL TO ESTIMATE RELATIVE OBJECT SCALE

CROSS REFERENCE

The present application claims the benefit under 35 U.S.C. § 119 of German Patent Application No. DE 10 2021 205 034.4 filed on May 18, 2021, which is expressly incorporated herein by reference in its entirety.

FIELD

The present invention relates to a system and computer-implemented method for training a machine learnable model to estimate a relative scale of objects in an image. The present invention further relates to a system and computer-implemented of estimating a relative scale of objects in an image, for example to determine a scene geometry of an image. The present invention further relates to a computer-readable medium comprising data representing instructions for a processor system to perform any computer-implemented method.

BACKGROUND INFORMATION

The field of computer vision is concerned with enabling machines to "see" and obtain an understanding of their environment. A core task in computer vision is to identify and classify objects in images, for example pedestrians or vehicles in camera images acquired by autonomous vehicle, or parts to be handled by a manufacturing robot, etc.

Scale is a natural attribute of an object shown in an image, as basic property as location and appearance. Here, the term 'scale' may refer to the apparent size of the object in the image, which may be dependent on the distance of the object to the camera, the camera's focal point, etc. Computer vision tasks typically need to account for (varying) scale of objects in images. For example, image classification is preferably scale-invariant to achieve accurate classification results. In image segmentation, scale-equivariance is important as the output map should scale proportionally to the input. In object detection or object tracking, it is important to be both scale-invariant as well as scale-equivariant.

Scale invariance or equivariance is usually dealt with in computer vision by providing a sufficient variety of examples in the training data, e.g., objects at different scales. It is also possible to adapt the machine learnable models and/or their training to provide scale invariance or equivariance. For example, a document "Scale-Equivariant Steerable Networks", 2019, https://arxiv.org/abs/1910.11093v1, describes incorporating a mechanism for scale-equivariance into a CNN to improve the performance of the CNN, wherein performance can be understood as the CNNs ability to correctly classify images. The scale-equivariance mechanism is based on constructing the filters of the convolutional layers of the neural network such that they are a weighted sum of basis filters (also referred to as basis functions), wherein the weights can be trained during training of the CNN.

While it conventional to adapt and/or train machine learnable models for computer vision tasks to be scale invariant or equivariant, or at least to be scale invariant or equivariant to an adequate degree, it may be desirable to obtain an explicit indication of relative scale of objects in an image. This may for example allow estimating a geometry of a scene depicted in the image. For example, if a scene is densely populated with similar objects, such as flowers in a flower field, the relative scale of the objects in the image of the scene may indicate the geometry of the scene, being in this case a planar surface containing the objects, which surface slants away towards the horizon. This may be apparent from objects located closer to the bottom of the image having a larger apparent size, with the apparent size then decreasing towards the middle of the image. In other words, the relative scale of objects may allow conclusions to be drawn on the geometry of the scene, which may be valuable in many real-life applications, such as autonomous driving where a camera image showing show a densely populated field of vehicles may indicate a traffic jam. Another example is an environment with many pedestrians, and in which the geometry of the scene may be used to identify pedestrian closer to a self driving car to be able to sort the pedestrians on importance, wherein the self driving car may neglect unimportant pedestrians, as they are to far away. In general, obtaining an understanding between objects by scale may allow relations between objects to be identified, as objects of a same or similar scale may be related. This may be used to generate a relation graph of objects.

It is conventional to train a machine learnable model to provide an explicit indication of scale of objects in an image by using supervised learning, e.g., by providing training data in which objects are annotated including their scale, e.g., in pixels or as a value relative to the image resolution. Disadvantageously, this requires extensive training data showing objects at various scales, and significant manual involvement, e.g., to provide the labels and to carefully construct the machine learnable model to be able to explicitly indicate the scale.

It would be advantageous to be able to obtain a scale estimator which is easier to train, e.g., in a non-supervised manner, and has limited computationally complexity.

SUMMARY

In accordance with a first aspect of the present invention, a computer-implemented method and corresponding system are provided, for training a machine learnable model to estimate a relative scale of objects in an image. In accordance with a further aspect of the present invention, a computer-implemented method and corresponding system are provided, for estimating a relative scale of objects in an image. In accordance with a further aspect of the present invention, a computer-readable medium is provided, comprising instructions for causing a processor system to perform any of the computer-implemented methods.

In accordance with the above measures, a scale estimator is provided which may comprise a machine learnable model part, such as a neural network, and which may be trained to provide a relative scale estimate. In accordance with an example embodiment of the present invention, the scale estimator may be provided as an 'addon' to a feature extractor. Such a feature extractor may be an existing 'conventional' feature extractor which is configured to receive an image patch as input, for example of 64 by 64 pixels or having any other suitable spatial dimensions, and to extract a number of features from the image patch which are associated with one or more objects in the image. Examples of features includes different types of edges, texture, corners, etc. These features may be manually defined, but may also be machine learned, for example by the feature extractor having been previously trained on training data comprising examples of the objects. The feature extractor may, as is conventional, provide a plurality of feature maps as output. For example, if the feature extractor comprises a convolutional neural network (CNN), such feature maps may be constituted or represented by the CNN's output channels. Furthermore, the feature extractor may be adapted, and in case of a machine learned feature extractor, trained, to be scale equivariant, at least to an adequate degree. This may manifest itself in a feature map having a scale dimension. Accordingly, the feature extractor may provide respective filter responses along a scale dimension. Such feature extractors are described, for example, in co-pending European Patent Application No. EP 20 19 5059 which is hereby incorporated by reference in as far as pertaining to the scale-equivariant CNN (SE-CNN) described therein, which input and convolutional layers may constitute an example of a feature extractor as described in this specification.

The scale estimator may be configured to aggregate each feature map which is obtained from the output of the feature extractor. For example, such aggregation may involve aggregating filter responses along various dimensions of a feature map, such as its spatial dimensions. In particular, along the scale dimension, a maximum filter response may be identified, which may result in the aggregation of the feature map providing a feature-level scale estimate. In a specific example, if a CNN has 512 output channels, the aggregation may result in 512 feature-level scale estimates, each being derived from the maximum filter response along a feature map's respective scale dimension. The scale estimator may further comprise a machine learnable model part, such as the aforementioned neural network, which model part may be configured to receive the feature-level scale estimates as input and to output a patch-level scale estimate, representing an overall scale estimate for the image patch provided as input.

In accordance with an example embodiment of the present invention, for that purpose, the machine learnable model part may be trained on training data. However, instead of relying on supervised training, in which a patch-level scale estimate is provided manually or at least externally as ground truth, a suitable target for the training may be generated during the training. Namely, it may be sufficient for the scale estimator to be able to learn a relative scale of objects, for example to learn that one object is closer to the camera than another object. Such a relative scale may not represent an absolute measure of scale and may thereby not allow conclusions to be drawn on the absolute size of objects, e.g., on an object being 2 m wide or the like. Nevertheless, such a relative scale may be sufficient for various purposes, including the aforementioned estimation of a scene geometry. The training target for the estimation of a relative scale may, in accordance with the measures in accordance with the present invention, be generated by spatially scaling image data of an image patch of a training image in accordance with at least two known scale factors. For example, the image data in the image patch may be downscaled, e.g., by a factor of 0.75, and upscaled, e.g., by a factor of 1.5. It will be appreciated that such upscaling may involve cropping while the downscaling may involve padding so to obtain to image patches of equal dimensions.

Another example is that the image data of an image patch may be scaled by a factor of 1.0, e.g., with a unitary scale factor, and by a factor of 1.5. Various other examples of such scale factors are equally possible. Such a scale factor may be referred to as a 'known' or 'actual' scale factor.

In accordance with an example embodiment of the present invention, the feature extractor and scale estimator may then be applied to the image patches comprising the scaled image data, resulting in at least two patch-level scale estimates. While it may not be known what the absolute size of an object in either image patch is, the relative size of an object between the two image patches may now be known, being represented by a relation between the two known scale factors. This relation may for example be expressed as a difference (e.g., 2.0-0.5=1.5) or by a ratio (e.g., 2.0/0.5=4.0), etc., and may also be referred as an actual relative scale, with 'actual' referring to the fact that the image data was actually scaled in accordance with the respective scale factors and 'relative' referring to the number representing the relation (e.g., the difference or ratio) between the scale factors. The same relation may be calculated for patch-level scale estimates, resulting in an estimated relative scale. A loss function may be formulated by which the training strives to adapt parameters of the machine learnable model part, such as the weights of a neural network, to learn to estimate the actual relative scale. Namely, the loss function may express a mismatch between the actual relative scale and the estimated relative scale, and the training may seek to minimize the mismatch. Accordingly, the scale estimator may learn to better estimate the relative scale. This does not require a manually provided ground truth, since the actual relative scale may be internally generated. As such, the training of the scale estimator may be facilitated. Moreover, the scale estimator may be simply provided as an addon to an (existing) feature extractor. This contributes to separation of concerns, in that one may not need to be overly concerned with the feature extractor itself, but rather train the scale estimator to adapt itself to the feature maps provided by a particular feature extractor. Furthermore, it has been found that such a scale estimator may also be architecturally relatively simple since it may 'merely' need to aggregate the feature maps into feature-level scale estimates and to combine the feature-level scale estimates into a patch-level scale estimate. Such a combination may be done by a comparatively simple machine learnable model part when compared to the feature extractor itself. For example, a shallow neural network having only one hidden layer may suffice in many applications. Accordingly, if a feature extractor is already available, for example for object detection or classification purposes, a scale estimator may be added with comparatively little cost in terms of computational complexity and/or training effort.

Optionally, a respective feature map comprises at least two spatial dimensions and the scale dimension, wherein the scale estimator is configured to aggregate the respective feature map over the at least two spatial dimensions by averaging, weighting, or majority selection. The spatial dimensions of a feature map may not be of particular relevance for scale estimation. As such, the spatial dimensionality may be reduced, e.g., to 1×1, by aggregating the feature map over the spatial dimensions, e.g., by averaging, weighting, majority selection or similar technique. In a specific example, a global average pooling layer may be used to reduce a H×W×S feature map to a 1×1×S feature map (with 'S' representing the scale dimensionality).

Optionally, the scale estimator is configured to aggregate the respective feature map over the scale dimension by identifying a spatial scale at which the filter response is maximal and by using an identifier of the spatial scale as or as part of the feature-level scale estimate. The feature map may be aggregated, e.g., from 1×1×S to 1×1×1, by identifying a spatial scale at which the filter response is maximal and by using an identifier of the spatial scale as or as part of the feature-level scale estimator. For example, if there is a predefined set of scales $\{1,\sqrt{2},2,2\sqrt{2},4,4\sqrt{2},\ldots\}$, which may for example be defined as hyperparameters of the feature extractor, the feature-level scale estimate may be an index of the set corresponding to the scale at which the maximum feature response is obtained, e.g., as identified by an argmax operator.

Optionally, the machine learnable model part of the scale estimator comprises a neural network. For example, the neural network may be a shallow neural network having one hidden layer. It has been found that that such a neural network, or in general a shallow multilayer perceptron (MLP), may suffice to learn to combine the feature-level scale estimates into a patch-level scale estimate. Such a MLP may require few resources to implement and may be easy to train given its relatively few parameters.

Optionally, the error term defines a mean squared error or mean squared deviation between the actual relative scale and the estimated relative scale. The mean squared error (MSE) or mean squared deviation (MSD) are both well-suited as error functions while needing few resources to implement and to evaluate at runtime.

Optionally, a scene geometry map indicative of a scene geometry of the image is generated by:
  applying the feature extractor and the scale estimator to a plurality of image patches of the image to obtain a plurality of patch-level scale estimates;
  generating the scene geometry map for the image as a representation of the plurality of patch-level scale estimates in relation to the plurality of image patches.

As discussed elsewhere, the patch-level scale estimates may be combined into a scene geometry map, for example by constructing an array representing the image patches, with each position in the array comprising the respective patch-level scale estimate. Such an array may resemble a map for the image, and may be indicative of the scene geometry, as will also be elucidated elsewhere in this specification.

Optionally, the feature extractor and the scale estimator are applied to overlapping image patches of the image. Since the scale estimator may produce one patch-level scale estimate per image patch, the resulting scene geometry map may be relatively low resolution compared to the input image if the scale estimator is applied to non-overlapping image patches. To increase the resolution of the scene geometry map, the feature extractor and scale estimator may be applied to overlapping image patches. This may provide a more detailed and accurate scene geometry map for the image.

Optionally, the scene geometry map is generated by:
  subtracting, from the plurality of patch-level scale estimates in the scene geometry map, a minimum of the plurality of patch-level scale estimates; and/or
  spatially upscaling the scene geometry map to a spatial resolution of the image.

Optionally, the image may be obtained from a sensor which is configured to sense an environment of a computer-controlled entity, the scene geometry map of the image is analyzed, and control data is generated for the computer-controlled entity based on a result of the analysis to adapt control the computer-controlled entity to its environment. A computer-controlled entity, such as a robotic system or an autonomous vehicle, may be controlled based on a result of an analysis of the scene geometry map. For example, the image for which the scene geometry map is generated may be obtained by an onboard camera, with the scene geometry map being indicative of a geometry of the scene acquired by the onboard camera. For example, the scene geometry map may indicate that there is a traffic jam ahead of an autonomous vehicle, in which case it may be desirable to differently control the vehicle, e.g., to slow down.

It will be appreciated by those skilled in the art that two or more of the above-mentioned embodiments, implementations, and/or optional aspects of the present invention may be combined in any way deemed useful, in view of the disclosure herein.

Modifications and variations of any system, any computer-implemented method or any computer-readable medium, which correspond to the described modifications and variations of another one of the entities, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

LIST OF REFERENCE NUMBERS AND ABBREVIATIONS

The following list of reference numbers is provided for facilitating the interpretation of the figures and shall not be construed as limiting the scope of the present invention.

- 100 system for training a machine learnable model to estimate a relative scale of objects in an image
- 120 processor subsystem
- 140 data storage interface
- 150 data storage
- 152 training data
- 154 data representation of feature extractor
- 156 data representation of scale estimator
- 200 method of training a machine learnable model to estimate a relative scale of objects in an image
- 210 providing feature extractor
- 220 providing scale estimator
- 230 accessing training data
- 240 training
- 245 repeating for next image patch
- 250 spatially scaling image patch to obtain scaled image patches
- 260 applying feature extractor and scale estimator
- 270 optimizing machine learnable model part of scale estimator
- 300 image patch
- 310 image patch with downscaled image data
- 320 image patch with upscaled image data
- 360 feature extractor
- 380 scale estimator
- 400 image showing flower field
- 410 image partitioned into image patches
- 412 image patch
- 420 scene geometry map
- 430 upscaling
- 440 scene geometry map upscaled to image resolution
- 500 system for estimating a relative scale of objects in an image
- 520 processor subsystem
- 540 data storage interface
- 550 data storage
- 552 image data
- 554 data representation of feature extractor
- 556 data representation of scale estimator
- 560 sensor data interface
- 562 sensor data
- 570 control interface
- 572 control data
- 600 environment
- 610 (semi)autonomous vehicle
- 620 sensor
- 622 camera
- 630 actuator
- 632 electric motor
- 700 method of estimating a relative scale of objects in an image
- 710 providing feature extractor
- 720 providing scale estimator
- 730 applying feature extractor and scale estimator to image patch
- 740 repeating for next image patch
- 750 outputting data representation of patch-level scale estimate(s)
- 800 computer-readable medium
- 810 non-transitory data

DETAILED DESCRIPTION OF EXAMPLE EMBODIMENTS

Figure 1:
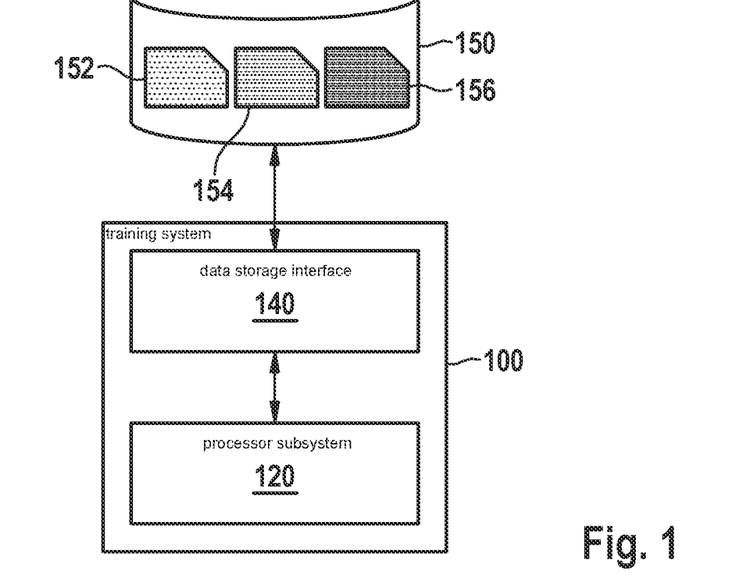
FIG. 1 shows a system for training a machine learnable model to estimate a relative scale of objects in an image, in accordance with an example embodiment of the present invention.
Figure 2:
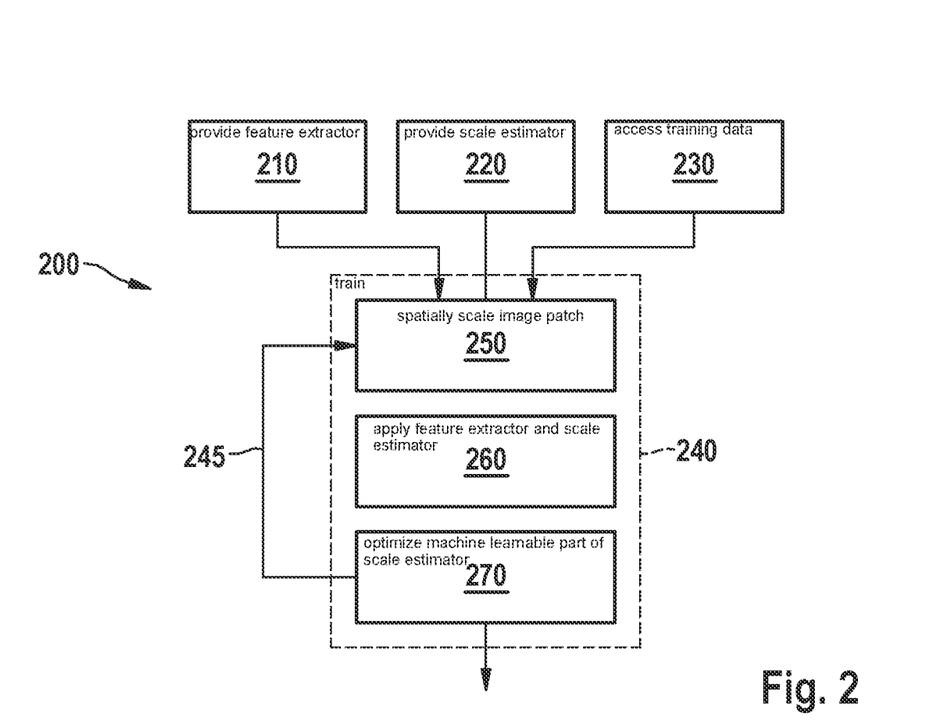
FIG. 2 shows steps of a computer-implemented method for training a machine learnable model to estimate a relative scale of objects in an image, in accordance with an example embodiment of the present invention.
Figure 3:
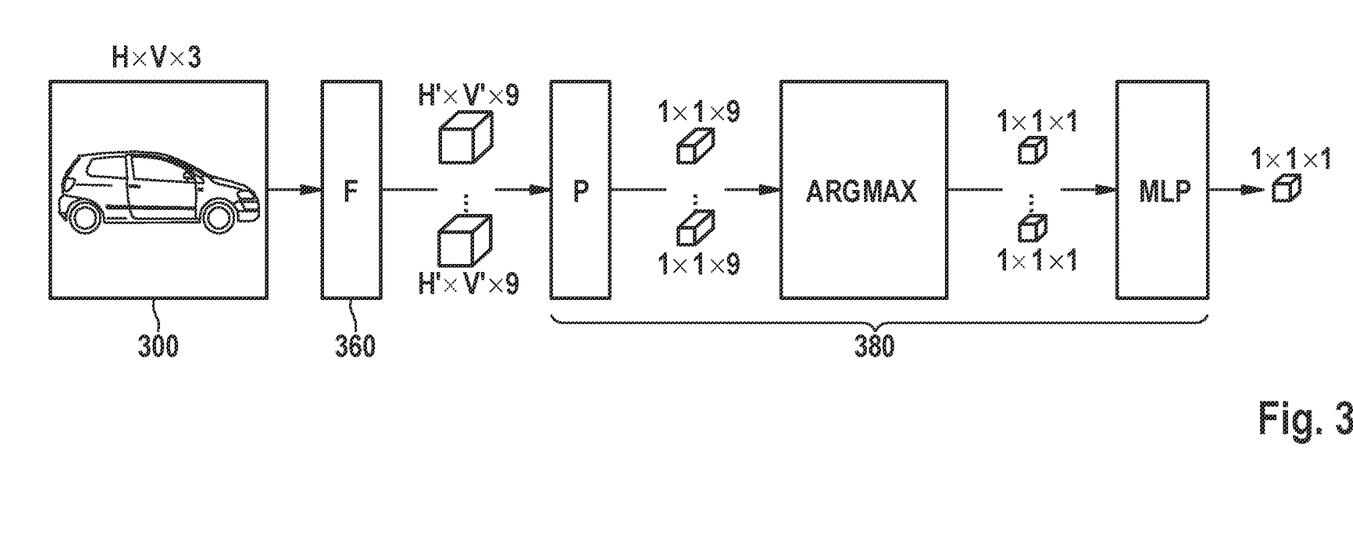
FIG. 3 shows a feature extractor and scale estimator being applied to image data of an image patch to generate a patch-level scale estimate for the image patch, in accordance with an example embodiment of the present invention.
Figure 4:
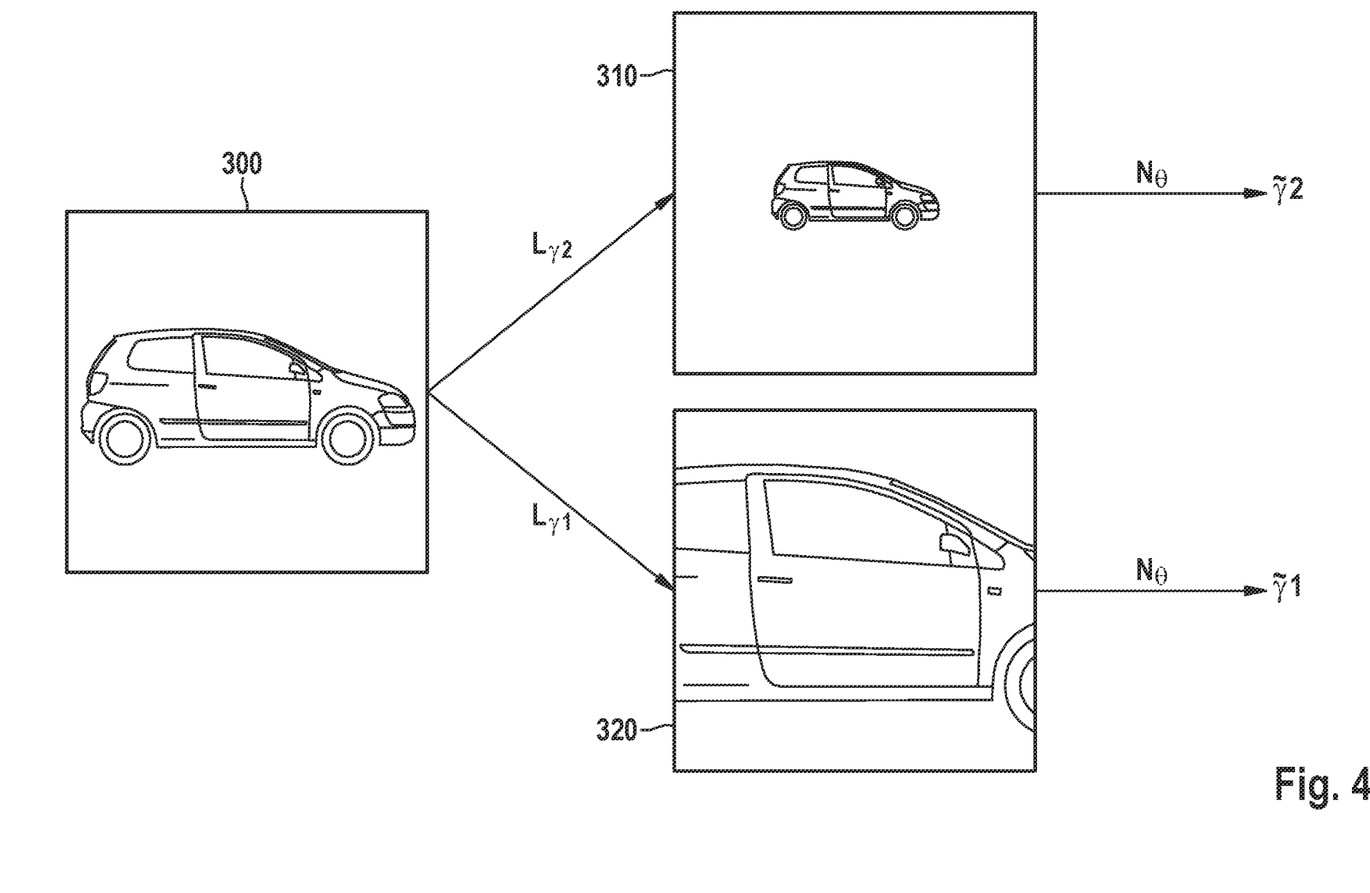
FIG. 4 illustrates calculation of an error term for the training of the scale estimator, which comprises scaling the image data of an image patch in accordance with two different scale factors and by estimating the scale factors using the scale estimator, with the error function expressing a mismatch between the relations of respective scale factors.
Figure 5A:
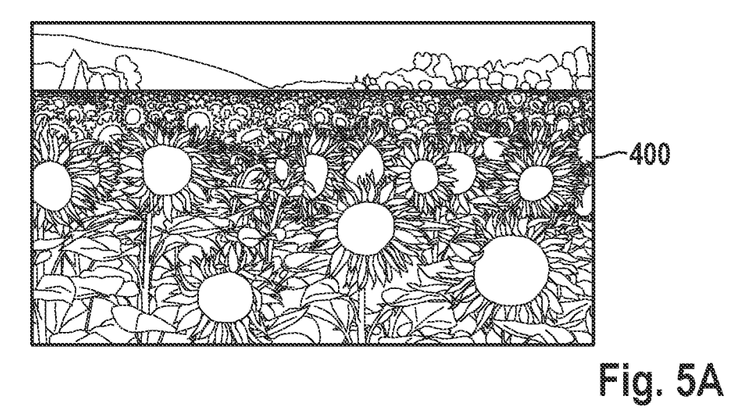
FIG. 5A shows an input image to a feature extractor and scale estimator.
Figure 5B:
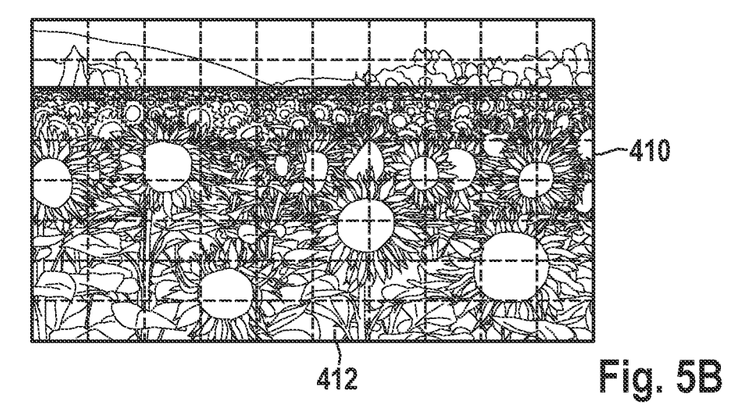
FIG. 5B shows the input image partitioned into non-overlapping image patches, with each image patch serving as input to the feature extractor and scale estimator.
Figure 5C:
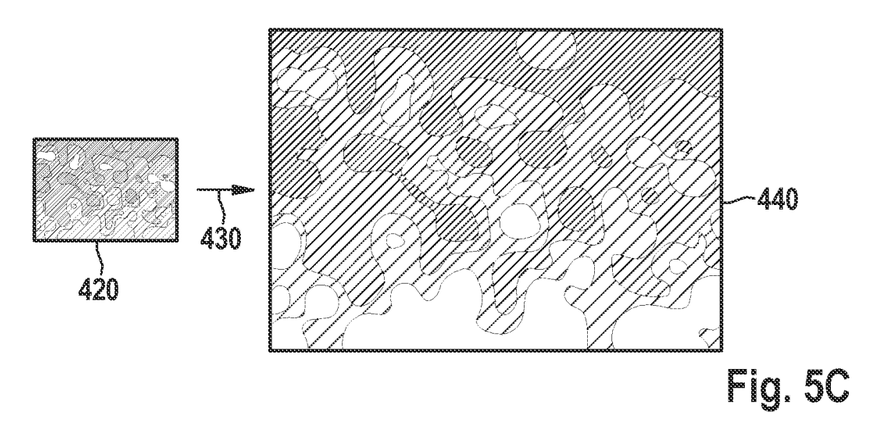
FIG. 5C shows a scene geometry map generated by the scale estimator, which scene geometry map comprises patch-level scale estimates for each image patch, wherein the scene geometry map is spatially upscaled to the image resolution.
Figure 6:
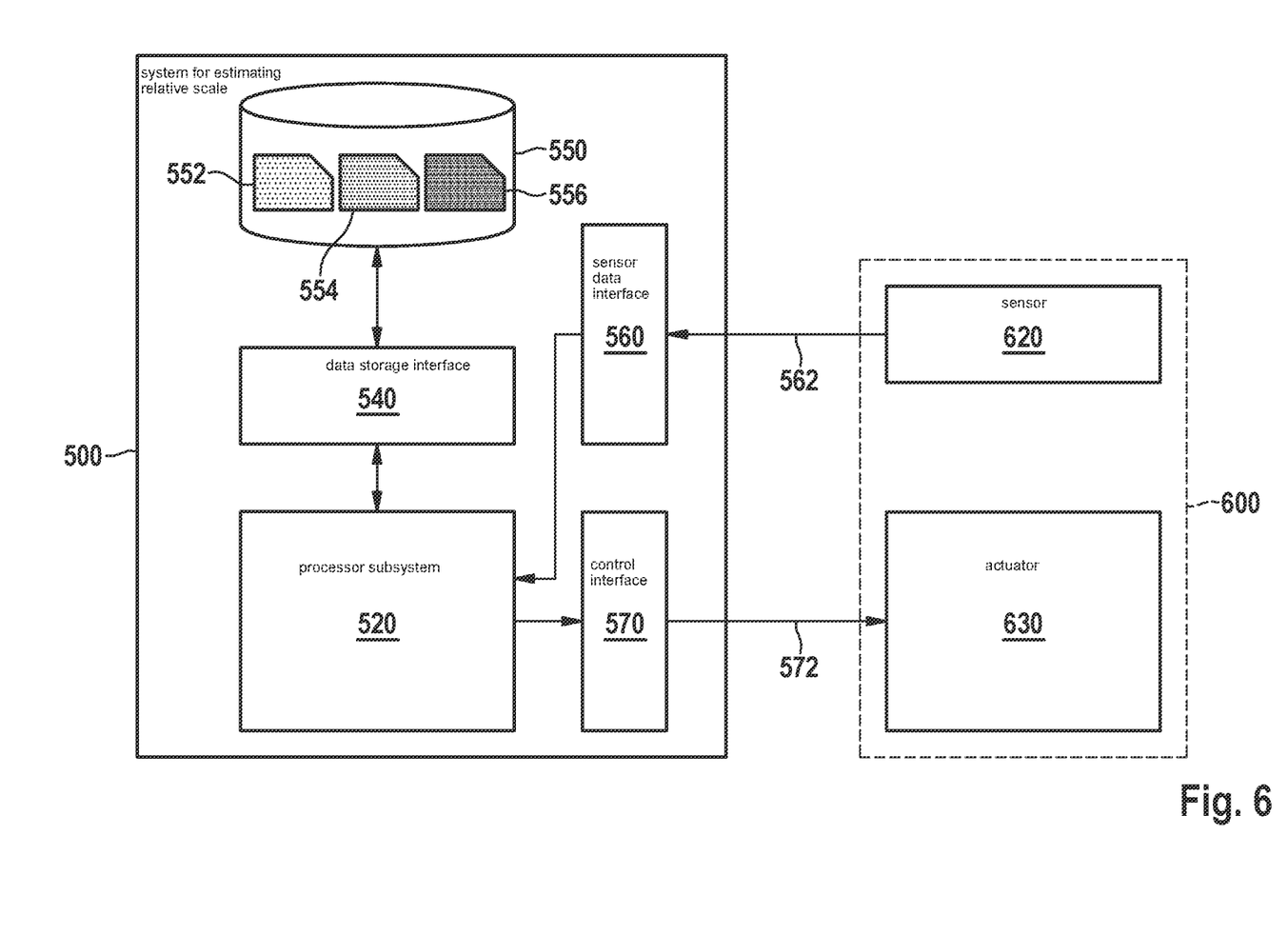
FIG. 6 shows a system for estimating a relative scale of objects in an image, in accordance with an example embodiment of the present invention.
Figure 7:
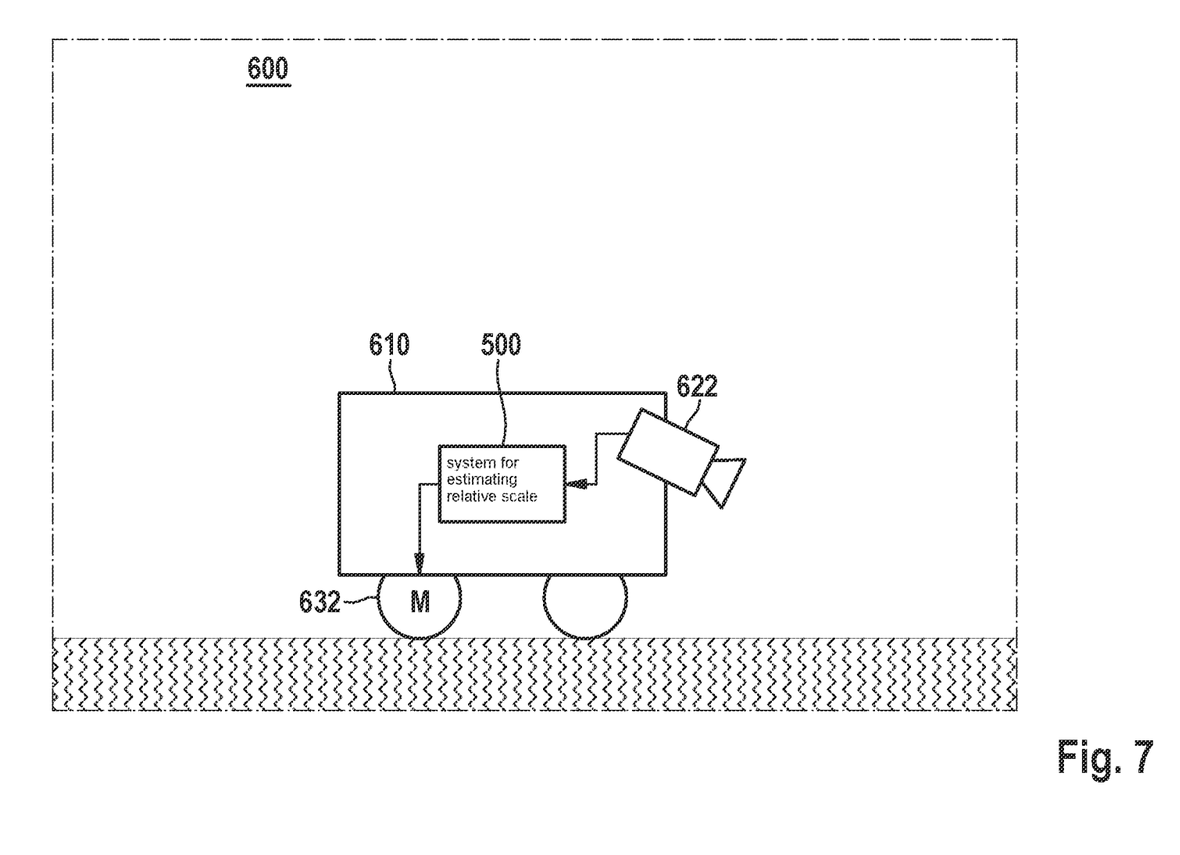
FIG. 7 shows a (semi-)autonomous vehicle comprising the system of FIG. 6 to generate and analyze a scene geometry map and to control the vehicle based thereon, in accordance with an example embodiment of the present invention.
Figure 8:
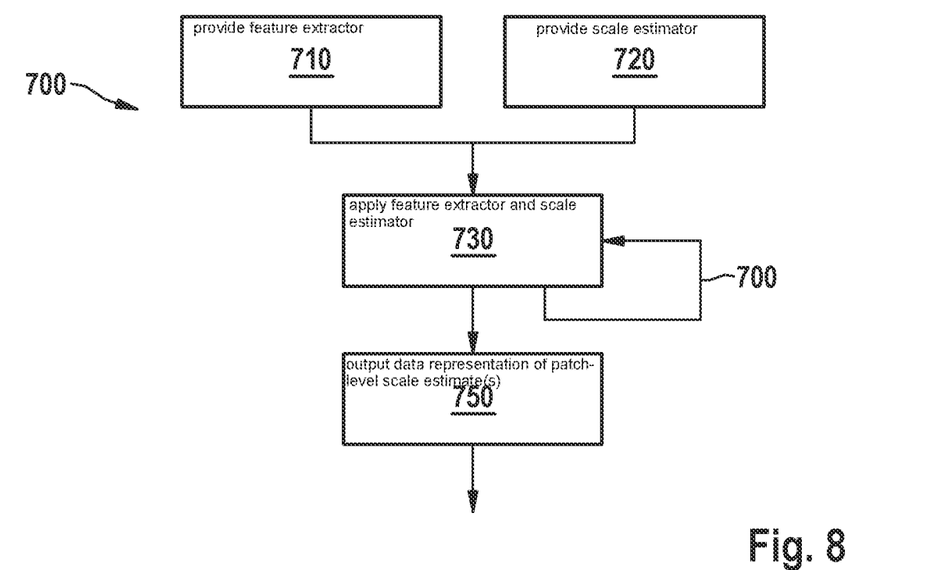
FIG. 8 shows steps of a computer-implemented method for estimating a relative scale of objects in an image, in accordance with an example embodiment of the present invention.
Figure 9:
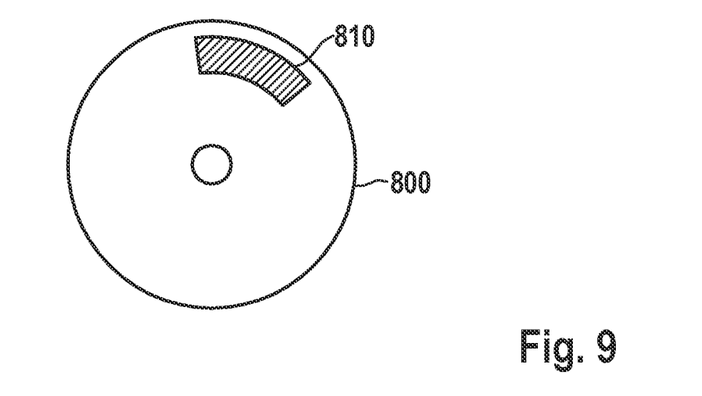
FIG. 9 shows a computer-readable medium comprising data.

The following describes with reference to FIGS. 1 and 2 a system and computer-implemented method for training a machine learnable model to estimate a relative scale of objects in an image, with reference to FIG. 3 a feature extractor and scale estimator being applied to image data of an image patch to generate a patch-level scale estimate for the image patch, with reference to FIG. 4 the training of a machine learnable model part of the scale estimator, with FIGS. 5A-5C the application of the scale estimator to an input image to generate a scene geometry map, with reference to FIGS. 6 and 8 a system and computer-implemented method for estimating a relative scale of objects in an image, and with reference to FIG. 7 an autonomous vehicle incorporating the system of FIG. 6. FIG. 9 shows a computer-readable medium used in embodiments of the present invention disclosed herein.

FIG. 1 shows a system 100 for training a machine learnable model to estimate a relative scale of objects in an image. The system 100 may comprise an input interface subsystem for accessing training data 152 for the training. For example, as illustrated in FIG. 1, the input interface subsystem may comprise or be constituted by a data storage interface 140 which may provide access to training data 152 on a data storage 150. For example, the data storage interface 140 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 150 may be an internal data storage of the system 100, such as a memory, hard drive, or SSD, but also an external data storage, e.g., a network-accessible data storage.

In some embodiments, the data storage 150 may further comprise a data representation 154 of a feature extractor and a data representation 156 of a scale estimator, both of which will be discussed in detail in the following and which may be accessed by the system 100 from the data storage 150. It will be appreciated, however, that the training data 152, the data representation 154 of the feature extractor and the data representation 156 of the scale estimator may also each be accessed from a different data storage, e.g., via different data storage interfaces. Each data storage interface may be of a type as is described above for the data storage interface 140. In other embodiments, the data representations 154, 156 of the feature extractor and/or the scale estimator may be internally generated by the system 100, for example on the basis of design parameters or a design specification, and therefore may not explicitly be stored on the data storage 150.

The system 100 may further comprise a processor subsystem 120 which may be configured to, during operation of the system 100, train the scale estimator 156, and in particular a machine learnable model part of the scale estimator 156, on the training data 152 in a manner as described elsewhere in this specification. For example, the training by the processor subsystem 120 may comprise executing an algorithm which optimizes parameters of the scale estimator 156 using a training objective, e.g., a loss function. In some embodiments, the feature extractor 154 may also comprise or consist of a machine learnable model, and the processor subsystem 120 may be configured to also train the feature extractor 154 on the training data 152, or on different or additional training data.

The system 100 may further comprise an output interface for outputting a data representation of the trained scale estimator, this scale estimator also being referred to as a machine 'learned' scale estimator and the data also being referred to as trained scale estimator data. It will be appreciated that 'trained' refers here and elsewhere to at least the machine learnable model part of the scale estimator having been trained. For example, as also illustrated in FIG. 1, the output interface may be constituted by the data storage interface 140, with the interface being in these embodiments an input/output ('IO') interface via which the trained scale estimator may be stored in the data storage 150. For example, the data representation 156 defining the 'untrained' scale estimator may during or after the training be replaced, at least in part, by a data representation of the trained scale estimator, in that the parameters of the scale estimator 156, in particular parameters of the machine learnable model part of the scale estimator 156, may be adapted to reflect the training on the training data 152. In other embodiments, the data representation of the trained scale estimator may be stored separately from the data representation 156 of the 'untrained' scale estimator. In some embodiments, the output interface may be separate from the data storage interface 140 but may in general be of a type as described above for the data storage interface 140.

FIG. 2 shows a computer-implemented method 200 for training a machine learnable model, and in particular a scale estimator, to estimate a relative scale of objects in an image. The method 200 may correspond to an operation of the system 100 of FIG. 1, but does not need to, in that it may also correspond to an operation of another type of system, apparatus, device or entity or in that it may correspond to steps of a computer program.

The method 200 is shown to comprise, in a step titled "PROVIDING FEATURE EXTRACTOR", providing 210 a feature extractor as described elsewhere in this specification, in a step titled "PROVIDING SCALE ESTIMATOR", providing 220 a feature extractor as described elsewhere in this specification, and in a step titled "ACCESSING TRAINING DATA", accessing 230 training data comprising a set of training images. The method 200 is further shown to comprise, in a step titled "TRAINING", training 240 the machine learnable model part of the scale estimator on the training data, wherein the training comprises, in a step titled "SPATIALLY SCALING IMAGE PATCH TO OBTAIN SCALED IMAGE PATCHES", spatially scaling 250 image data of an image patch of a training image by at least two known scale factors to obtain at least two further image patches, in a step titled "APPLYING FEATURE EXTRACTOR AND SCALE ESTIMATOR", applying 260 the feature extractor and the scale estimator to the at least two further image patches to obtain at least two patch-level scale estimates, and in a step titled "OPTIMIZING MACHINE LEARNABLE MODEL PART OF SCALE ESTIMATOR", optimizing 270 parameters of the machine learnable model part by minimizing a error term of a loss function, wherein the error term expresses a mismatch between an actual relative scale and an estimated relative scale, wherein the actual relative scale is determined as a difference between the two known known scale factors and the estimated relative scale as a difference between the at least two patch-level scale estimates. The training 240 may comprise a number of iteration loops, for example to iterate over different image patches of a training image, as shown by arrow 245 in FIG. 2, and over different training images (not shown).

With continued reference to the estimation of a relative scale of objects in an image, the measures described in this specification make use of a feature extractor and a scale estimator. The feature extractor may, but does not need to be, a machine learnable feature extractor, which may for example be trained separately from the scale estimator, for example on different types of training data, by different types of systems, and/or at different moments in time. For example, the system and methods for training the scale estimator may make use of a pretrained feature extractor, which may have been previously trained in a conventional manner. A nonlimiting example is that the feature extractor may be a scale equivariant convolutional neural network (SE-CNN) which be trained to extract features from image patches. Such feature extraction may result in the output of a feature map per feature, which feature map is in the example of a CNN also referred to as a 'channel' of the CNN.

Consider for example the function F: x→y where x,y are the input and output tensors, with F representing the feature extractor, e.g., the SE-CNN. The input tensor may be have the shape batch_size×3× height×width while the output tensor may have the shape batch_size×num_channels× num_scales×height'×width'. Here, 'batch_size' may refer to the number of image patches used as input, whereas the '3' may represent the three color components of the image data (e.g., RGB or YUV), the 'height' and 'width' may be the height and width of each image patch (e.g., 64 by 64 pixels), the 'num_channels' may represent the number of feature maps generated as output, the 'num_scales' may represent the number of scales at which features are detected and which in turn may correspond to a scale dimension of the feature map, and the height' and width' may represent the height and width of the feature map and thereby the spatial dimensions of the feature map.

As is conventional, the feature extractor may be configured to detect a plurality of features in the image patch to obtain a plurality of feature maps as output, wherein the plurality of features is associated with one or more objects in the image, wherein a respective feature map is generated by applying a filter to image data of the image patch, and wherein a respective feature map comprises, along a scale dimension, a filter response across a set of different spatial scales. The feature extractor may thus be configured to take scale information into account by providing filter responses across different scales. As is conventional, the feature extractor may be configured with which scales to use, e.g., in terms of number of scales and scale factors. For example, the scales may be defined as hyperparameters of the feature extractor. The number and step size between scales may be selected depending on the particular application. For example, if the image is a camera image obtained by an onboard camera of a vehicle which is likely to show a traffic jam, one may expect that the relative size of other cars in the traffic jam changes only slightly from one car to the next. One may thus use a relatively small step size between scales, such as 1.4. One may also expect that a very distant car may be at maximum be 8 times smaller than a car nearby, and thus choose 9 scales $1, \sqrt{2}, 2, 2\sqrt{2}, 4, 4\sqrt{2}, 8, 8\sqrt{2}, 16$, with the numbers referring for example to the relative filter sizes of the filters used for the different scales or relative kernel sizes. It will be appreciated that for other types of applications, a different number of scales and/or a different set of scales may be used than described here.

As an example of a feature extractor, an ImageNet-pretrained CNN may be used, such as the SE-CNN as described in European Patent Application No. EP 20 19 5059. One may further assume that a feature map shows features of only one object. As such, each feature map may be spatially aggregated, for example using a global spatial average pooling layer P. This layer may be provided as a last layer of the feature extractor, or as a separate layer following the feature extractor. In a specific example, the feature extractor may have 512 output channels. After aggregation, e.g., by means of the global spatial average pooling layer, the output tensor may have a shape of batch_size×512×9, with '9' referring to the number of scales. From each output, the scale may be extracted at which the maximum filter response was obtained. This may be done by max pooling over the dimensions of the scales, for example using an argmax operator. As a result, 512 predictions of scale may be obtained for each image patch. These predictions are elsewhere also referred to as feature-level scale estimates. A shallow multilayer perceptron G may then be used to regress these 512 feature-level scale estimates into one patch-level scale estimate. Here, G may represent an example of what is elsewhere referred to as the machine learnable model part of the scale estimator. The shallow multilayer perceptron may for example be a neural network with one hidden layer, or a deep neural network, or a linear regressor, or in general any model which may map a vector (the feature-level scale estimates) into a scalar (the patch-level scale estimate) and is differentiable. In this respect, it is noted that while the scale estimator may comprise a shallow machine learnable model part, this is not a requirement, as the scale estimator may also comprise a deep machine learnable model part, e.g., having several hidden layers.

FIG. 3 shows an example of the above, in which an image patch 300 of size H×V×3, with H×V being for example 64×64 pixels, is input to the feature extractor F 360, resulting in a number of feature maps of size H'×V'×9 with '9' being in this example the number of scales. A global spatial average pooling layer P may be used to spatially aggregate the feature maps into feature maps of size 1×1×9, which may be followed by an argmax operator which may produce a single feature-level scale estimate of 1×1×1 for each image patch. The machine learnable model part of the scale estimator 380, e.g., the shallow multilayer perceptron G, may then be used to combine all feature-level scale estimates, for example being 512 in number, into a single patch-level scale estimate.

An example of the scale estimator having one hidden layer may be described by PyTorch-like pseudo-code, as shown in the following code extract:

```
1   import torch
2   import torch.nn as nn
3   import SE_ResNet101
4
5   class ScaleEstimator(nn.Module):
6     def __init__(self):
7       super().__init__()
8       self.feature_extractor = SE_ResNet101(pretrained = True)
9       self.regressor = nn.Sequential (
10        nn.Linear(512, 256),
11        nn.ReLU( ),
12        nn.Linear(256, 1),
13        nn.ReLU( )
14      )
15
16    def forward (self, x):
17      # x.shape = B, 3, 64, 64
18      y = self.feature_extractor(x)
19      # y.shape = B, 512, 9, 1, 1
20      y = y.mean(-1).mean(-1)
21      # y.shape = B, 512, 9
22      y = y.argmax(-1)
23      biased_scale = self.regressor(y)
24      return biased_scale
```

With continued reference to FIG. 3, it is noted the global spatial average pooling layer P is shown to be separate from the feature extractor F. In some embodiments, the global spatial average pooling layer P, or a similar type of spatial aggregator function, may be part of a same overall network which also comprises the feature extractor F. In other words, a network may be provided which comprises both the feature extractor F followed by the global spatial average pooling layer P or similar function. Various other types of partitioning of elements of the feature extractor and the scale estimator are also possible.

The feature extractor F may in some examples be part of an object detector or classifier. Such an object detector or classifier may comprise additional network layers which process the feature maps of the feature extractor F to obtain an object segmentation or classification. In such examples, the feature maps may represent internal data of the object detector or classifier, which internal data may be accessed by the scale estimator to estimate the scale. In such examples, the feature maps may thus be used both for object detection or classification by the object detector or classifier, and for scale estimation.

The scale estimator, and in particular its machine learnable model part, such as a multilayer perceptron G, may be trained using a suitable dataset. For example, a dataset of natural images of various classes may be used, such as ImageNet or STL-10. The training may involve defining a training objective, for example by defining a loss function. FIG. 4 illustrates the calculation of this loss function. Here, it is shown that an image patch 300 from the training data may be scaled, e.g., by interpolation, in accordance with two different scale factors, which scaling may be identified as $L_{\gamma_1}$, $L_{\gamma_2}$ with $\gamma_1$, $\gamma_2$ being the respective scale factors. For example, such scale factors may be randomly sampled from a range, e.g., from 0.5-2.0. This may result in two image patches 310, 320 containing scaled image data, which may be fed into the network $N_\theta$ which is comprised of the feature extractor and scale estimator, with the scale estimator having a machine learnable model part with parameters $\theta$. The network $N_\theta$ may predict the scale factors $\tilde{\gamma}_1$, $\tilde{\gamma}_2$ as explained with reference to FIG. 3 by generating a patch-level scale estimate for each of the scaled image patches 310, 320. This may result in a set of actual scale factors $\gamma_1$, $\gamma_2$ and a set of estimated scale factors $\tilde{\gamma}_1, \tilde{\gamma}_2$. A loss function $\mathcal{L}_{scale}$ may then be defined as:

$$\mathcal{L}_{scale}(N_\theta)=\|(\tilde{\gamma}_1-\tilde{\gamma}_2)-(\gamma_1-\gamma_2)\|_2$$

This loss function may define a mismatch between an actual relative scale, as expressed by the term $\gamma_1-\gamma_2$ representing a difference between the two known known scale factors $\gamma_1$, $\gamma_2$, and an estimated relative scale, as expressed by the term $\tilde{\gamma}_1-\tilde{\gamma}_2$ representing a difference between the patch-level scale estimates $\tilde{\gamma}_1,\tilde{\gamma}_2$. If the mismatch is minimal, the network $N_\theta$ may be considered to accurately estimate the relative scale, in that the estimated relative scale resembles the actual relative scale. The training of the scale estimator in accordance with this loss function may provide for so-called scale-contrastive learning, in that the machine learnable model part of the scale estimator may be trained to predict how much one image should be interpolated to match the other. Such an approach does not require any dedicated depth or scale labels but is only supervised by the difference (delta) between the sampled scale factors $\gamma_1, \gamma_2$. In a specific embodiment, the training may be performed for 100 epochs with a batch size of 128, using the Adam optimizer and a learning rate set to $1 \cdot 10^{-3}$. The training procedure may be described using the following PyTorch-like pseudo-code, in which the actual relative scale is referred to as 'true_scale', the estimated relative scale as 'pred_scale', and in which an MSE is used as error term:

```
1    import random
2    import MSE
3
4    def train_model_one_step(model, optimizer, image ):
5        gamma_1 = random.uniform(0, 8)
6        gamma_2 = random.uniform(0, 8)
7        image_1 = rescale(image, gamma_1)
8        image_2 = rescale(image, gamma_2)
9        true_scale = gamma_1 - gamma_2
10       pred_scale = model(image_1) - model(image_2)
11       loss = MSE(true_scale, pred_scale)
12       loss.backward( )
13       optimizer.step( )
14       optimizer.zero_grad( )
```

With continued reference to the training, it is noted that any other suitable loss function may be used as well, for example one which uses a different error term than the MSE, such as a non-squared error or the like. In addition, instead of using the difference of scale factors, a ratio or other type of expression of a relation of scale factors may be used. For example, $\mathcal{L}_{scale}$ may be based on a difference of the ratios of scale factors:

$$\mathcal{L}_{scale}(N_\theta) = \|(\tilde{\gamma}_1/\tilde{\gamma}_2) - (\gamma_1/\gamma_2)\|_2$$

In a specific example, the relation of scale factors may be expressed as a logarithm of the difference of scale factors, or as the logarithm of their ratio.

In some examples, a loss function may be defined taking more than two image patches into account, e.g., by using three or more scale factors. In some examples, at least one of the scale factors is 1.0, e.g., representing a unitary scale factor.

Having trained the scale estimator, and in particular the machine learnable model part of the scale estimator having parameters θ, the combination of feature extractor and scale estimator may be used to estimate a relative scale of objects in images.

FIGS. 5A-5C illustrate an inference by the scale estimator. Here, FIG. 5A shows an example input image 400 to the feature extractor and scale estimator, showing in this particular example a scene in form of a flower field. FIG. 5B shows the input image 410 partitioned into non-overlapping image patches 412, with each image patch serving as input to the feature extractor and scale estimator. FIG. 5C shows a scene geometry map 420 generated by the scale estimator, which scene geometry map 420 may be generated as an image-like representation of the patch-level scale estimates for each image patch. Here, different gray tones indicate different scale estimates. It can be seen that the scene geometry map indicates that the scene contains objects which are nearer to the camera at the bottom of the image and further away from the camera near the middle and top of the image. As shown by the arrow 430, the scene geometry map 420 may be spatially upscaled to a higher resolution, such as the input image 410's resolution, e.g., using bicubic interpolation, yielding an upscaled scene geometry map 440. In some examples, a minimum estimated patch-level scale estimate $\gamma_{min}$ may be subtracted from each individual patch level scale estimate, e.g., before or after generating the scene geometry map 420, 440. The inference procedure may be described by the following PyTorch-like pseudo-code:

```
1    import split_into_patches
2    import upsample
3
4    def estimate_scale(model, image ):
5        # image.shape = 1, 3, 512 , 256
6        patches = split_into_patches (image, patch_size =64)
7        # now the image is split into 8x4=32 patches
8        # each of size 64 x64
9        # patches.shape = 32, 3, 64, 64
10       scales = model(patches)
11       # scales.shape = 32, 1
12       scales = scales.view(8, 4)
13       scales = upsample(scales, factor=64, mode ='bicubic')
14       # scales.shape = 512, 256
15       scales = scales - scales.min( )
16       return scales
```

Various uses of the estimation of relative scale of objects are possible, with the generation of scene geometry maps being merely an example. Nevertheless, the ability to easily generate a scene geometry map by estimating patch-level scale estimates for the image patches of an input image may be advantageous in many applications. Such scene geometry maps may be particularly accurate for images of scenes in which a same or similar type object, such as a car, person, flower, etc., appears in a dense arrangement, as in the case of images of traffic jams, crowded spaces, sport stadiums, concerts, fields, etc.

A specific example is an image of an on-board camera of a vehicle. In case the vehicle encounters a traffic jam, the road itself and the road markers (e.g., as lines) may not be visible or only partially visible. The scene may be very dense, in that there is a dense arrangement of other vehicles in front of the vehicle. In this case, the geometry of the road, for example its curvature, may be estimated from a scene geometry map, which in turn may be obtained by estimating the relative position and scale of the cars in the scene.

Another example is a traffic camera somewhere above a wide road, which usually observes either pedestrians crossing the road, or cars. The traffic camera may perform automatic object detection and may be trained to detect people actually crossing the road. A scene geometry map may be used to perform a sanity check, in that it may indicate that, in an example where an open-roof double-decker bus is passing by, the people detected by the camera are located on a surface which is above the ground, so unlikely to be actually crossing the road. In such and similar cases, the scene geometry map may thus be used as an additional input to decision logic following image-based object detection.

FIG. 6 shows a system 500 for estimating a relative scale of objects in an image using the feature extractor and scale estimator as described elsewhere. The system 500 may comprise an input interface subsystem for accessing data representations of the feature extractor and scale estimator. For example, as also illustrated in FIG. 6, the input interface subsystem may comprise a data storage interface 540 via which a data representation 554 of the feature extractor and a data representation 556 of the scale estimator may be accessed. In general, the data storage interface 540 and the data storage 550 may be of a same type as described with reference to FIG. 1 for the data storage interface 140 and the data storage 150. FIG. 6 further shows the data storage 550 comprising image data 552 of an image to which the feature extractor and scale estimator may be applied to estimate a relative scale of objects therein. For example, the image data 552 may be acquired by an image sensor of a camera or may be sensor data acquired by another type of spatial sensor, such as lidar or radar, which sensor data may be represented as an image. In some embodiments, such sensor data may also be received directly from a sensor 620, for example via a sensor data interface 560 or another type of interface, instead of being accessed from the data storage 550. In such embodiments, the sensor data 562 may be received 'live', e.g., in real-time or pseudo real-time, by the system 500.

The system 500 may further comprise a processor subsystem 520 which may be configured to, during operation of the system 500, apply the feature extractor and scale estimator to the image data 552, and/or the sensor data 562 as image data, to generate at least one patch-level scale estimate, or in some examples, a number of patch-level scale estimates for respective image patches of the image data, e.g., in form of a scene geometry map. In general, the processor subsystem 520 may be configured to perform any of the functions as previously described with reference to FIGS. 3-5C and elsewhere. It will be further appreciated that the same considerations and implementation options apply for the processor subsystem 520 of FIG. 6 as for the processor subsystem 120 of FIG. 1. It will be further appreciated that the same considerations and implementation options may in general apply to the system 500 of FIG. 6 as for the system 100 of FIG. 1, unless otherwise noted.

FIG. 6 further shows various optional components of the system 500. For example, in some embodiments, the system 500 may comprise a sensor data interface 560 for directly accessing sensor data 562 acquired by a sensor 620 in an environment 600. The sensor 620 may, but does not need to, be part of the system 500. The sensor 620 may have any suitable form, such as an image sensor or another type of spatial sensor. The sensor data interface 560 may have any suitable form corresponding in type to the type of sensor(s), including but not limited to a low-level communication interface, an electronic bus, or a data storage interface of a type as described above for the data storage interface 540.

In some embodiments, the system 500 may comprise an output interface, such as a control interface 570 for providing control data 572 to for example an actuator 630 in the environment 600. Such control data 572 may be generated by the processor subsystem 520 to control the actuator 630 based on an analysis of output of the scale estimator. For example, the actuator 630 may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Thereby, the system 500 may act in response to the estimate of a relative scale of object(s) in the image data, e.g., to control a manufacturing process, to control a robotic system or an autonomous vehicle, etc.

In other embodiments (not shown in FIG. 6), the system 500 may comprise an output interface to a rendering device, such as a display, a light source, a loudspeaker, a vibration motor, etc., which may be used to generate a sensory perceptible output signal which may be generated based on the output of the scale estimator. The sensory perceptible output signal may be directly indicative of a patch-level scale estimate or scene geometry map but may also represent a derived sensory perceptible output signal. Using the rendering device, the system 500 may provide sensory perceptible feedback to a user.

In general, each system described in this specification, including but not limited to the system 100 of FIG. 1 and the system 500 of FIG. 6, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 500 may be part of a control system configured to control a physical entity or a manufacturing process or may be part of a data analysis system. In some embodiments, the system 500 may be part of vehicle, robot, or similar computer-controlled entity, and/or may be represent a control system configured to control the entity.

FIG. 7 shows an example of the above, in that the system 500 is shown to be a control system of a (semi-)autonomous vehicle 610 operating in an environment 600. The autonomous vehicle 600 may incorporate the system 500 to control aspects such as the steering and the braking of the autonomous vehicle based on sensor data obtained from a camera 622 integrated into the vehicle 600. For example, the system 500 may control an electric motor 632 to perform (regenerative) braking in case the autonomous vehicle 600 is expected to encounter a traffic jam, as may be detected from a scene geometry map.

FIG. 8 shows a computer-implemented method 700 of estimating a relative scale of objects in an image. The method 700 may correspond to an operation of the system 500 of FIG. 6 but may also be performed using or by any other system, machine, apparatus, or device. The method 700 is shown to comprise, in a step titled "PROVIDING FEATURE EXTRACTOR", providing 710 a feature extractor as described elsewhere in this specification, and in a step titled "PROVIDING SCALE ESTIMATOR", providing 720 a scale estimator extractor as described elsewhere in this specification. The method 700 is further shown to comprise, in a step titled "APPLYING FEATURE EXTRACTOR AND SCALE ESTIMATOR TO IMAGE PATCH", applying 730 the feature extractor and scale estimator to at least one image patch of the image to obtain a patch-level scale estimate for the at least one image patch, optionally repeating 740 said step 730 for other image patches, and in a step titled "OUTPUTTING DATA REPRESENTATION OF PATCH-LEVEL SCALE ESTIMATE(S)", outputting 750 a data representation of patch-level scale estimate(s), for example in the form of a scene geometry map as described elsewhere in this specification.

In some embodiments, the computer-implemented method 200 of FIG. 2 and the computer-implemented method 700 of FIG. 8 may be embodied by a same computer program or may be carried out by a same system. In other embodiments, the computer-implemented method 200 of FIG. 2 and the computer-implemented method 700 of FIG. 8 may be embodied by different computer programs or may be carried out by different systems.

It will be appreciated that, in general, the operations or steps of the computer-implemented methods 200 and 700 of respectively FIGS. 2 and 8 may be performed in any suitable order, e.g., consecutively, simultaneously, or a combination thereof, subject to, where applicable, a particular order being necessitated, e.g., by input/output relations.

Each method, algorithm or pseudo-code described in this specification may be implemented on a computer as a computer implemented method, as dedicated hardware, or as a combination of both. As also illustrated in FIG. 9, instructions for the computer, e.g., executable code, may be stored on a computer-readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 9 shows an optical disc 800. In an alternative embodiment, the computer-readable medium 800 may comprise the data representation of the feature extractor and/or the data representation of the scale estimator as described elsewhere in this specification.

Examples, embodiments or optional features, whether indicated as non-limiting or not, are not to be understood as limiting the present invention.

Mathematical symbols and notations are provided for facilitating the interpretation of the present invention and shall not be construed as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device described as including several means, several of these means may be embodied by one and the same item of hardware. The mere fact that certain measures are described separately does not indicate that a combination of these measures cannot be used to advantage.

What is claimed is:

1. A computer-implemented method of training a machine learnable model to estimate a relative scale of objects in an image, the method comprising the following steps:
    providing a feature extractor which is configured to:
        receive an image patch of the image as input, and
        detect a plurality of features in the image patch to obtain a plurality of feature maps as output, wherein the plurality of features is associated with one or more objects in the image, wherein each respective feature map of the feature maps is generated by applying a filter to image data of the image patch, wherein
        each respective feature map includes, along a scale dimension, a filter response across a set of different spatial scales;
    providing a scale estimator to process the output of the feature extractor, wherein the scale estimator includes a machine learnable model part and is configured to:
        aggregate each respective feature map into a feature-level scale estimate,
            wherein the aggregation includes identifying a maximum filter response across the different spatial scales, thereby obtaining a plurality of feature-level scale estimates, and
        infer, with the machine learnable model part, a patch-level scale estimate from the plurality of feature-level scale estimates;
        accessing training data including a set of training images; and
    training the machine learnable model part of the scale estimator on the training data to infer the patch-level scale estimate from the plurality of feature-level scale estimates, wherein the training includes:
        spatially scaling image data of each image patch of a training image by at least two known scale factors to obtain at least two further image patches,
        applying the feature extractor and the scale estimator to the at least two further image patches to obtain at least two patch-level scale estimates, and
        optimizing parameters of the machine learnable model part by minimizing an error term of a loss function, wherein the error term expresses a mismatch between an actual relative scale and an estimated relative scale,
        wherein the actual relative scale is determined as a difference between the two known scale factors and the estimated relative scale as a difference between the at least two patch-level scale estimates.

2. The computer-implemented method according to claim 1, wherein each respective feature map includes at least two spatial dimensions and the scale dimension, and wherein the scale estimator is configured to aggregate the respective feature map over the at least two spatial dimensions by averaging, or weighting, or majority selection.

3. The computer-implemented method according to claim 1, wherein the scale estimator is configured to aggregate the respective feature map over the scale dimension by identifying a spatial scale at which the filter response is maximal and by using an identifier of the spatial scale as or as part of the feature-level scale estimate.

4. The computer-implemented method according to claim 1, wherein the machine learnable model part of the scale estimator includes a neural network.

5. The computer-implemented method according to claim 4, wherein the neural network is a shallow neural network having one hidden layer.

6. The computer-implemented method according to claim 1, wherein the error term defines a mean squared error or mean squared deviation between the actual relative scale and the estimated relative scale.

7. A computer-implemented method of estimating a relative scale of objects in an image, comprising the following steps:

providing a feature extractor which is configured to:
receive an image patch of the image as input,
detect a plurality of features in the image patch to obtain a plurality of feature maps as output, wherein the plurality of features is associated with one or more objects in the image, wherein each respective feature map of the feature maps is generated by applying a filter to image data of the image patch, and
wherein each respective feature map includes, along a scale dimension, a filter response across a set of different spatial scales;
providing a scale estimator to process the output of the feature extractor,
wherein the scale estimator includes a trained machine learnable model part, wherein the scale estimator is configured to:
aggregate each respective feature map into a feature-level scale estimate, wherein the aggregation includes identifying a maximum filter response across the different spatial scales, thereby obtaining a plurality of feature-level scale estimates, and
infer, with the machine learnable model part, a patch-level scale estimate from the plurality of feature-level scale estimates;
applying the feature extractor and the scale estimator to at least one image patch of the image to obtain a patch-level scale estimate for the at least one image patch; and
outputting a data representation of the patch-level scale estimate.

8. The computer-implemented method according to claim 7, wherein the machine learnable model part is trained by:
accessing training data including a set of training images,
spatially scaling image data of each image patch of a training image by at least two known scale factors to obtain at least two further image patches,
applying the feature extractor and the scale estimator to the at least two further image patches to obtain at least two patch-level scale estimates, and
optimizing parameters of the machine learnable model part by minimizing an error term of a loss function, wherein the error term expresses a mismatch between an actual relative scale and an estimated relative scale, herein the actual relative scale is determined as a difference between the two known scale factors and the estimated relative scale as a difference between the at least two patch-level scale estimates.

9. The computer-implemented method according to claim 8, further comprising generating a scene geometry map indicative of a scene geometry of the image by:
applying the feature extractor and the scale estimator to a plurality of image patches of the image to obtain a plurality of patch-level scale estimates; and
generating the scene geometry map for the image as a representation of the plurality of patch-level scale estimates in relation to the plurality of image patches.

10. The computer-implemented method according to claim 9, further comprising applying the feature extractor and the scale estimator to overlapping image patches of the image.

11. The computer-implemented method according to claim 9, further comprising at least one of:
subtracting, from the plurality of patch-level scale estimates in the scene geometry map, a minimum of the plurality of patch-level scale estimates; and
spatially upscaling the scene geometry map to a spatial resolution of the image.

12. The computer-implemented method according to claim 9, further comprising:
obtaining the image from a sensor which is configured to sense an environment of a computer-controlled entity;
analyzing the scene geometry map of the image; and
generating control data for the computer-controlled entity based on a result of the analysis to adapt control the computer-controlled entity to its environment.

13. The computer-implemented method according to claim 12, wherein the computer-controlled entity is a robotic system or an autonomous vehicle.

14. A non-transitory computer-readable medium on which is stored data representing instructions training a machine learnable model to estimate a relative scale of objects in an image, the instructions, when executed by a processor system, causing the processor system to perform the following steps:
providing a feature extractor which is configured to:
receive an image patch of the image as input, and
detect a plurality of features in the image patch to obtain a plurality of feature maps as output, wherein the plurality of features is associated with one or more objects in the image, wherein each respective feature map of the feature maps is generated by applying a filter to image data of the image patch, wherein each respective feature map includes, along a scale dimension, a filter response across a set of different spatial scales;
providing a scale estimator to process the output of the feature extractor, wherein the scale estimator includes a machine learnable model part and is configured to:
aggregate each respective feature map into a feature-level scale estimate,
wherein the aggregation includes identifying a maximum filter response across the different spatial scales, thereby obtaining a plurality of feature-level scale estimates, and
infer, with the machine learnable model part, a patch-level scale estimate from the plurality of feature-level scale estimates;
accessing training data including a set of training images; and
training the machine learnable model part of the scale estimator on the training data to infer the patch-level scale estimate from the plurality of feature-level scale estimates, wherein the training includes:
spatially scaling image data of each image patch of a training image by at least two known scale factors to obtain at least two further image patches,
applying the feature extractor and the scale estimator to the at least two further image patches to obtain at least two patch-level scale estimates, and
optimizing parameters of the machine learnable model part by minimizing an error term of a loss function, wherein the error term expresses a mismatch between an actual relative scale and an estimated relative scale,
wherein the actual relative scale is determined as a difference between the two known scale factors and the estimated relative scale as a difference between the at least two patch-level scale estimates.

15. A system for training a machine learnable model to estimate a relative scale of objects in an image, comprising:

an input interface subsystem configured to access:
    training data including a set of training images;
    a feature extractor which is configured to:
        receive an image patch of the image as input,
        detect a plurality of features in the image patch to obtain a plurality of feature maps as output, wherein the plurality of features is associated with one or more objects in the image, wherein a respective feature map is generated by applying a filter to image data of the image patch, and
        wherein a respective feature map includes, along a scale dimension, a filter response across a set of different spatial scales;
    a scale estimator configured to process the output of the feature extractor, wherein the scale estimator includes a machine learnable model part and is configured to:
        aggregate a respective feature map into a feature-level scale estimate, wherein the aggregation includes identifying a maximum filter response across the different spatial scales, thereby obtaining a plurality of feature-level scale estimates, and
        infer, with the machine learnable model part, a patch-level scale estimate from the plurality of feature-level scale estimates;
    a processor subsystem configured to train the machine learnable model part of the scale estimator on the training data to infer the patch-level scale estimate from the plurality of feature-level scale estimates, wherein the training includes:
        spatially scale image data of an image patch of a training image by at least two known scale factors to obtain at least two further image patches,
        apply the feature extractor and the scale estimator to the at least two further image patches to obtain at least two patch-level scale estimates,
        optimize parameters of the machine learnable model part by minimizing an error term of a loss function, wherein the error term expresses a mismatch between an actual relative scale and an estimated relative scale, wherein the actual relative scale is determined as a difference between the two known scale factors and the estimated relative scale as a difference between the at least two patch-level scale estimates.

16. A system for estimating a relative scale of objects in an image, comprising:
an input interface subsystem configured to access:
    the image,
    a feature extractor which is configured to:
        receive an image patch of the image as input;
        detect a plurality of features in the image patch to obtain a plurality of feature maps as output, wherein the plurality of features is associated with one or more objects in the image, wherein a respective feature map is generated by applying a filter to image data of the image patch,
        wherein a respective feature map includes, along a scale dimension, a filter response across a set of different spatial scales;
    a scale estimator configured to process the output of the feature extractor, wherein the scale estimator includes a trained machine learnable model part, and wherein the scale estimator is configured to:
        aggregate a respective feature map into a feature-level scale estimate, wherein the aggregation includes identifying a maximum filter response across the different spatial scales, thereby obtaining a plurality of feature-level scale estimates, and
        infer, with the machine learnable model part, a patch-level scale estimate from the plurality of feature-level scale estimates; and
    a processor subsystem configured to:
        apply the feature extractor and the scale estimator to at least one image patch of the image to obtain a patch-level scale estimate for the at least one image patch, and
        output a data representation of the patch-level scale estimate.

17. The system according to claim 16, wherein the machine learnable model part is trained by a training system configured to:
    access training data including a set of training images;
    spatially scale image data of each image patch of a training image by at least two known scale factors to obtain at least two further image patches;
    apply the feature extractor and the scale estimator to the at least two further image patches to obtain at least two patch-level scale estimates; and
    optimize parameters of the machine learnable model part by minimizing an error term of a loss function, wherein the error term expresses a mismatch between an actual relative scale and an estimated relative scale, herein the actual relative scale is determined as a difference between the two known scale factors and the estimated relative scale as a difference between the at least two patch-level scale estimates.

* * * * *